United States Patent Office 3,808,104
Patented Apr. 30, 1974

3,808,104
MULTI-STAGE EVAPORATOR
Maxwell Wingate Davidson, Edinburgh, Scotland, assignor to Maxwell Davidson Evaporators Limited, West Bromwich, England
Filed Mar. 1, 1971, Ser. No. 119,607
Claims priority, application Great Britain, Mar. 4, 1970, 10,301/70
Int. Cl. B01d 1/00, 1/26, 3/02
U.S. Cl. 202—173
10 Claims

ABSTRACT OF THE DISCLOSURE

A multi-stage evaporator for evaporating a liquid by means of a heating fluid comprising a plurality of evaporator stages arranged in series communication one above the other wherein each stage includes one or more evaporating passages through which the liquid to be evaporated is caused to descend, the evaporating passages being flanked by passages to which heating fluid is supplied, the arrangement being such that the heating fluid condenses, giving up heat to the liquid to be evaporated, and condenses in reservoirs which are divided by partitions to form barometric leg arrangements. The condensed heating fluid in the reservoirs thereby maintains a pressure differential between successive stages. A collector tray beneath each stage collects residual unevaporated liquid and delivers it to the evaporating passages of the next stage. The tray also collects condensed heating fluid overflowing from barometric legs and delivers this to the heating passages of the next stage. The tray includes apertures to allow vapor to pass from the evaporating passages of one stage to the heating passages of the next stage.

BACKGROUND OF THE INVENTION (1) Field of the invention

This invention relates to evaporators of the type for evaporating a liquid by means of a heating fluid. Such evaporators are especially but not exclusively applicable for use in distillation plants for the desalination of seawater.

SUMMARY OF THE INVENTION

The object of the present invention is to provide a new or improved multi-stage evaporator which can be constructed simply and economically and which will operate with improved efficiency.

According to the present application we provide a multi-stage evaporator for evaporating a liquid by means of a heating fluid comprising a plurality of evaporator stages arranged in series communication one above the other wherein:

(a) Each stage includes at least one pair of vertically arranged spaced parallel plates each of which plates comprises top, middle and bottom portions, the middle portions in combination defining a central evaporating passage whilst the top portions extend downwardly and inwardly towards one another to provide in combination a pressure reducing orifice arranged to receive the liquid to be evaporated and opening towards the central passage, the bottom portions extend upwardly and outwardly to provide reservoirs for the reception of condensed heating fluid, partitions each extending into a respective one of the reservoirs to define with the reservoir walls a U-leg arrangement in the reservoir so as to define with the middle portion of a respective plate a passage for said heating fluid, and sealing means resiliently engaging the ends of the plates and partitions, the partitions in combination with a quantity of said condensed heating fluid in each U-leg dviding the evaporator into a first, relatively higher, pressure zone including the passages for the heating fluid and a second, relatively lower. pressure zone including the central evaporating passage, and said condensed fluid due to the pressure differential between said zones overflowing from the U-leg to an outlet passage, and (b) A respective collector tray is provided between each pair of vertically adjacent stages to separate the condensed heating fluid from residual unevaporated liquid from the, or each, central evaporating passage and to deliver the condensed heating fluid from one stage into the heating fluid passages of the next succeeding stage and to deliver the residual unevaporated liquid from one stage into the pressure reducing orifices of the next succeeding stage.

The collector tray may comprise a shallow central portion which serves as a reservoir for the unevaporated liquid and has a plurality of downwardly extending spouts to deliver such liquid to the pressure reducing orifices leading to the central evaporating passages of the next stage of the evaporator, the central portion having a plurality of channels extending outwardly therefrom to receive unevaporated liquid from the central evaporating passages of the preceding stage and to direct such liquid into the central portion of the collector tray.

Transversely extending troughs may be provided beneath such channels adjacent to the ends thereof remote from the central portion of the collector tray to receive condensed fluid overflowing from the outlet passageways of the previous stage, such outlet passageways being so arranged that the condensed fluid is delivered primarily or wholly at the lateral margins of the outlet passageways so as to be discharged into said troughs.

The troughs may be open ended so that the condensed fluid collected therein is delivered from the ends of the troughs in the vicinity of fixed side plates forming part of a casing so as to flow down such side plates and into the outermost heating passages of the next stage. In this manner, the condensed fluid is cascaded from each stage to the next and contributed to the transmission of heat to the central evaporating passageways of the subsequent stages.

Provision may be made for withdrawing part of the vapor at any or each stage for supply to heat exchange means through which the original liquid to be evaporated is passed before entering the first stage of the evaporator.

The middle portions of the plates which define the central evaporating passage are preferably a fluted or corrugated form. Preferably the flutes or corrugations, hereinafter for convenience referred to simply as corrugations, extend downwardly at an oblique angle to the vertical edges of the plates. With this arrangement, when two identical plates are placed together in face-to-face relation to define the central evaporating passage, the corrugations of the respective plates extend transversely relative to each other so that the plates contact each other at a plurality of spaced points.

In a preferred arrangement, the corrugations do not extend completely to the edges of the middle portions of the plates, the latter having a plane margin at all edges.

One feature of the present invention resides in the provision of a distributor element within the central evaporating passage adjacent to the upper end thereof to direct liquid to be evaporated from said pressure reducing orifice onto the inner walls of said central evaporating passage so as to ensure the formation thereof of a continuous thin falling film of said liquid to be evaporated.

Conveniently, said distributor element is of generally trough-like form so that said liquid to be evaporated, after flowing through said orifice, is caused to flow upwardly on each side of the top portions of the plates which define said orifice and then outwardly over the upper edges of the trough-like distributor element and onto the inner walls of the central evaporating passage.

The middle portions of the plates which define the central evaporating passage may include outwardly cranked parts at a position above said pressure reducing orifice and the respective sides of the trough-like distributor element may include correspondingly outwardly cranked parts whereby said liquid to be evaporated overflowing over the upper edges of the trough-like distributor element is positively constrained to flow inwardly over said outwardly cranked parts of said middle portions of the plates.

The present invention will now be described by way of example only, with reference to the accompanying drawings wherein:

DESCRIPTION OF THE PREFERRED EMBODIMENT

Figure 3:
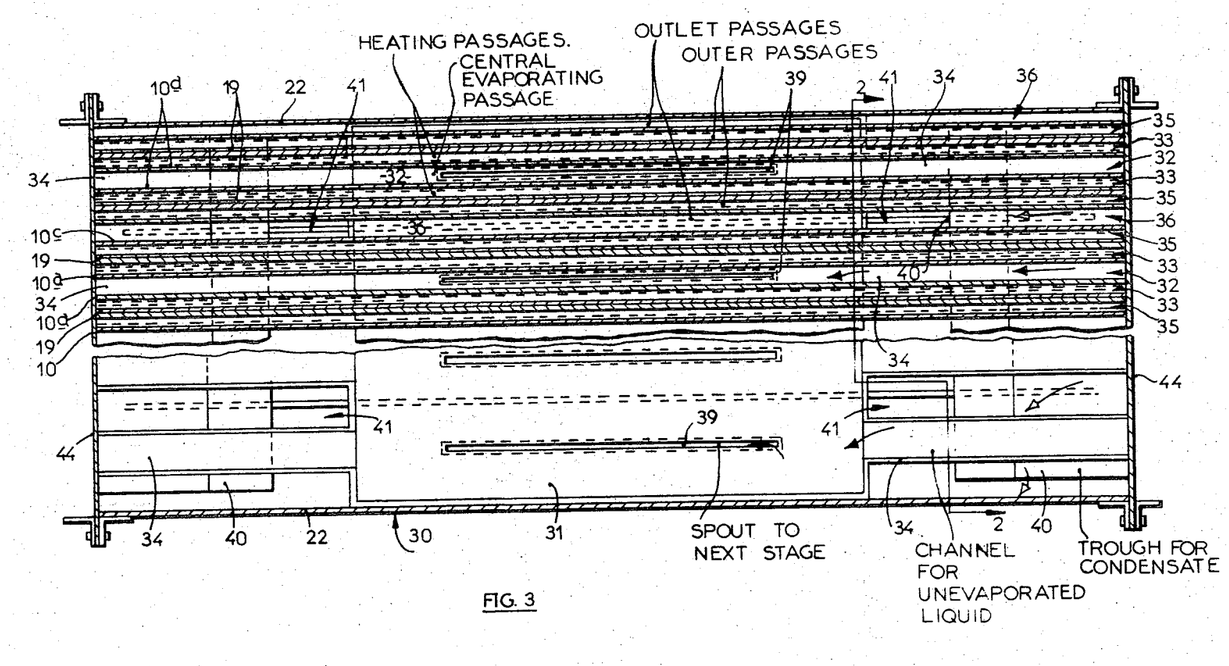
FIG. 3 shows a horizontal section on the line 3—3 of FIG. 2, on the same scale as FIG. 1.
Figure 4:
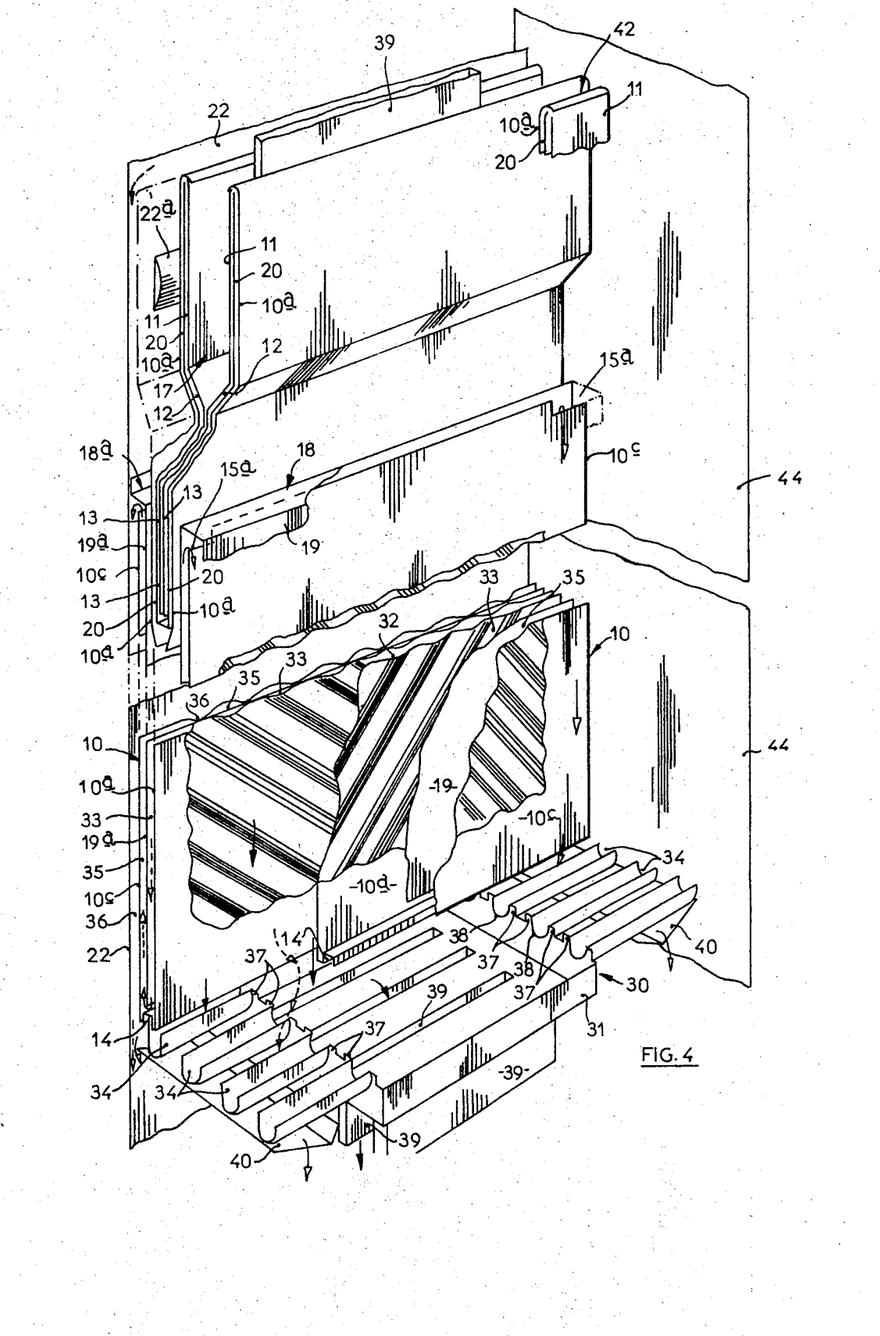
FIG. 4 shows a fragmentary perspective view of one stage of the evaporator and an associated collector tray.

The evaporator includes a casing which is open top and bottom and has two opposite vertical sides closed by side plates 22, the remaining two opposed sides of the casing being closed by resilient rubber diaphragms 44. One of the side plates 22 can be seen in FIGS. 2 and 4 of the accompanying drawings, and further parts of the casing are shown in FIG. 3, but otherwise the casing is omitted from these drawings for clarity.

Within the casing there is arranged a plurality of pairs of generally vertically disposed parallel composite plates 10. The plates 10 of each pair are of exactly identical form.

Each composite plate 10 comprises an inner or middle portion 10a, a top portion 10b, laterally offset to one side of the middle portion, and a bottom portion 10c laterally offset to the other side of the middle portion. Whilst each plate may be made from a single piece of sheet material folded, pressed, or otherwise formed, to the desired shape, the composite plates 10 as shown in the accompanying drawings are fabricated in three sections. Thus, the top portion 10b has a rolled over upper marginal edge portion which overlaps with a corresponding rolled portion at the upper edge of the middle portion 10a and is secured thereto by welding or any other suitable means. The bottom portion 10c is secured to the middle portion 10a through the intermediary of an inverted channel section strip 14 which is welded, or otherwise secured, to the lower margins of the middle and bottom portions of the composite plates 10.

Figure 2:
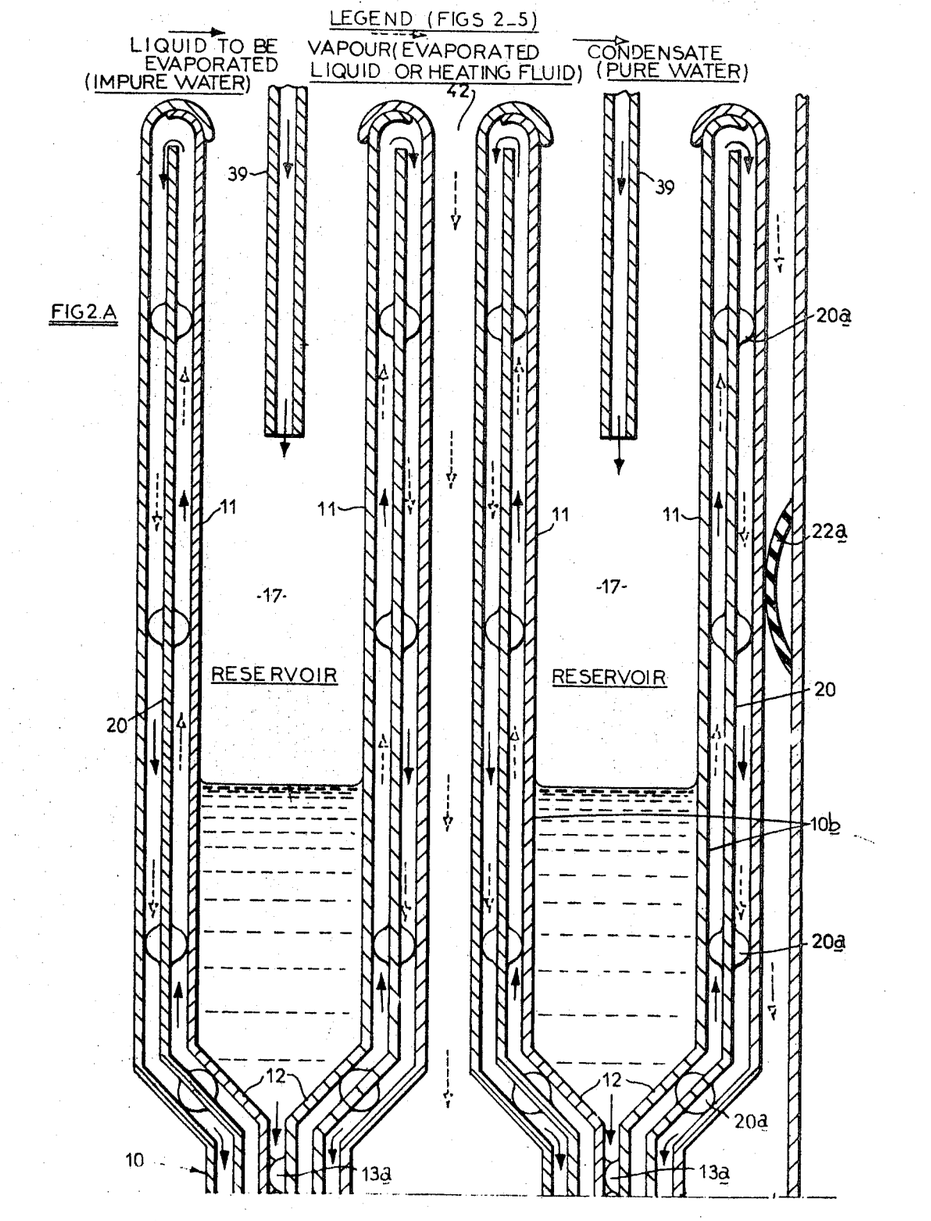
Figure 2B:
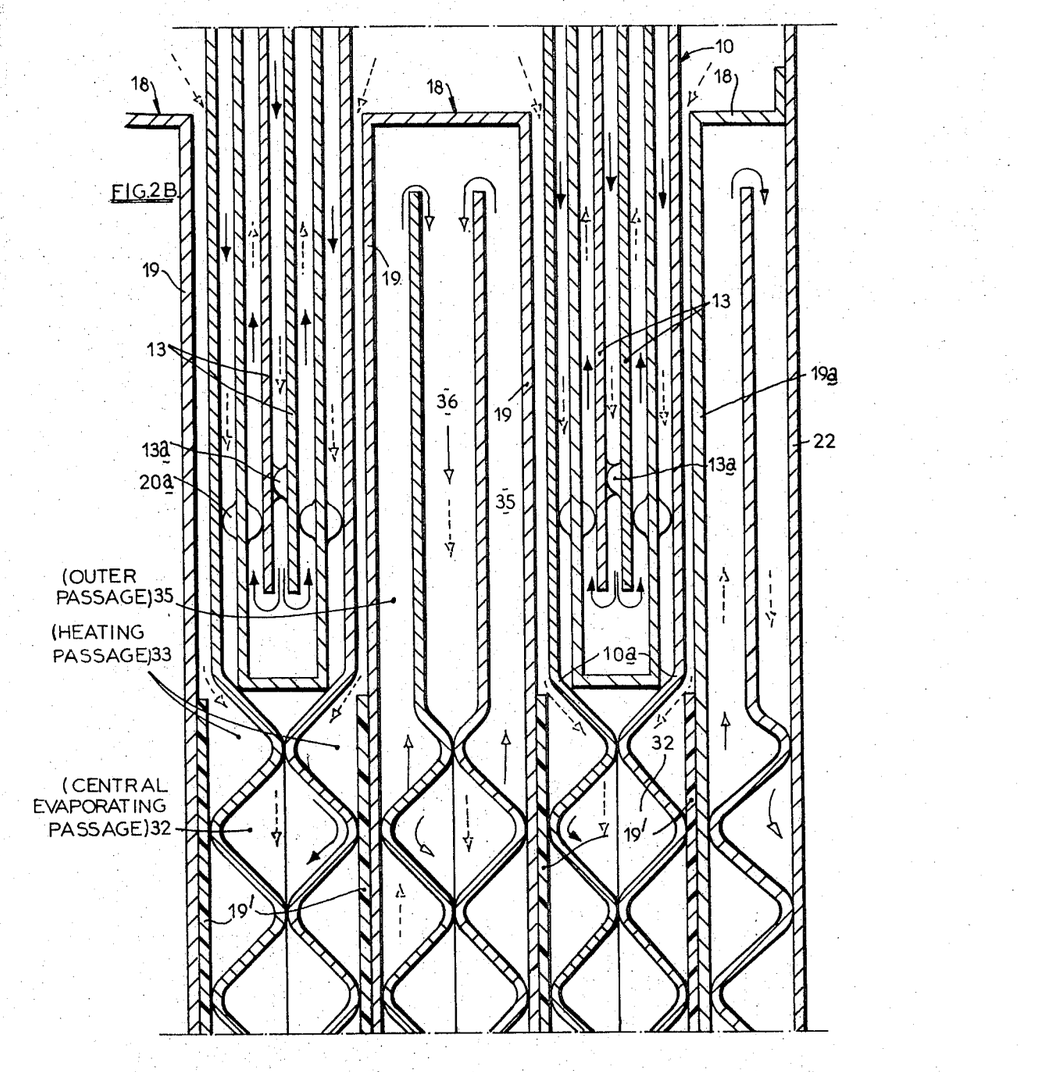
Figure 2C:
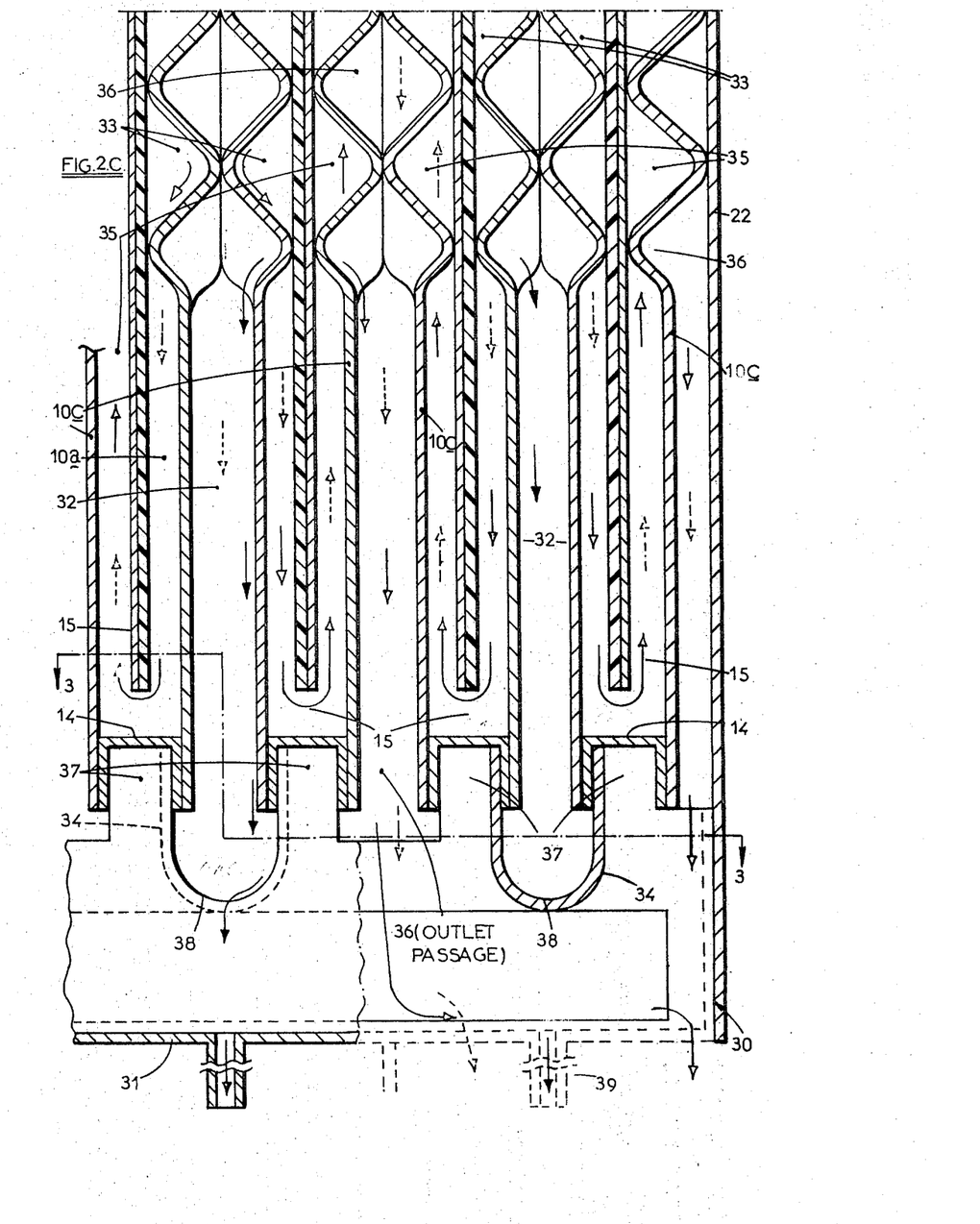

As can be seen best from FIG. 2, the middle portion 10a of each plate 10 is cranked so that the upper part thereof is displaced laterally, relative to the main part thereof, so as to lie substantially above the bottom portion 10c. The top portions 10b each extend downwardly from the upper edge of the respective middle portion 10a on the side thereof opposite to that at which the bottom portion 10c is disposed.

The composite plates 10 are assembled together in pairs with the top portions 10b of each pair disposed within the space defined between the middle portions 10a of each pair, the bottom portions 10c being disposed outside the space between the two middle portions 10a.

Each top portion 10b includes an upper part 11 which extends downwardly in inwardly spaced parallel relation to the adjacent upper part of the middle portion 10a. Each top portion 10b further includes an inwardly inclined part 12 which extends substantially parallel to and spaced inwardly from the outwardly cranked part of the middle portion 10a as shown. Each top portion 10b terminates in a lower part 13 which lies substantially parallel to, and spaced from, the upper margin of the main part of the middle portion 10a of the composite plate 10.

The top portions 10b of each pair of composite plates 10 thus defined in combination a reservoir 17 for the liquid to be evaporated. The lower parts 13 of the top portion 10b define in combination a slot-like pressure reducing duct through which the liquid can flow from the reservoir 17 into the space defined between the middle portions 10a of the two composite plates 10. This space constitutes a central evaporating passage 32 which is maintained, in the manner hereinafter described, at a lower pressure P2 than that P1 existing in the space outside each pair of composite plates 10.

Thus, as the liquid passes from the reservoir 17 through the duct into the central evaporating passage 32, it is partially "flashed." The remaining, unevaporated, liquid from the duct eventually forms a thin falling film on the inner surfaces of the middle portions 10a of each pair of composite plates 10 so as to be in heat exchange relation with a heating fluid which is contained in the space outside the pair of composite plates in the manner hereinafter described in more detail.

In order to ensure an even distribution of the unevaporated liquid across the entire width of the central evaporating passage 32, a trough-like distributor element 20 is provided internally of the passage 32. The trough element 20 includes a pair of side walls which are shaped similarly to the top portions 10b and are disposed between such top portions 10b and the associated upper parts of the adjacent middle portions 10a of the two plates 10. The side walls of the trough element 20 are formed with alternately inwardly and outwardly facing dimples 20a, as shown, which serve to maintain the lateral position of the trough element 20. In use, liquid flowing down through the duct defined between the parts 13 is constrained to flow upwardly between the outer surfaces of the plates 13 and the inner surface of the trough element 20 so that it overflows from the upper edges of the trough element 20 and then flows downwardly between the side walls of the trough element 20 and the inner surface of the upper part of the middle portion 10a. Due to the cranked shape of the latter, the liquid is thus positively constrained to form a film on the inner surface of the middle portion 10a.

Since the plates 10 are formed of thin sheet material, typically 23 gauge stainless steel sheet, the whole assembly is somewhat flexible and despite the provision of dimples 20a on the trough element 20, the spacing between the parts 13 can vary in accordance with the prevailing conditions.

However, the parts 13 may themselves be formed with inwardly facing dimples 13a as shown so that a minimum spacing between them is always maintained. Instead of such dimples, it would be possible to provide spacer members in the form of studs of rubber or preferably a suitable synthetic material secured in apertures in the parts 13. Such studs would preferably be formed to afford a relatively rigid part which is substantially incompressible so as to determine the minimum spacing between the parts 13. However, the studs would preferably also afford a soft or resilient projection extending beyond the relatively rigid part into contact with the opposed part 13 of the adjacent top portion 10b so as to prevent relative movement of the parts 13 in an uncontrolled manner.

Clamping pressure may be applied to the upper parts of the middle portions 10a of the outermost composite plates 10 by means of diaphragms 22a mounted in the side plates 22. The pressure applied by these diaphragms 22a is effectively transmitted through the whole assembly of plates 10 and enables the width of the duct to be adjusted so as to control the pressure drop occurring at the entrance to the central evaporating passage 32.

Figure 1:
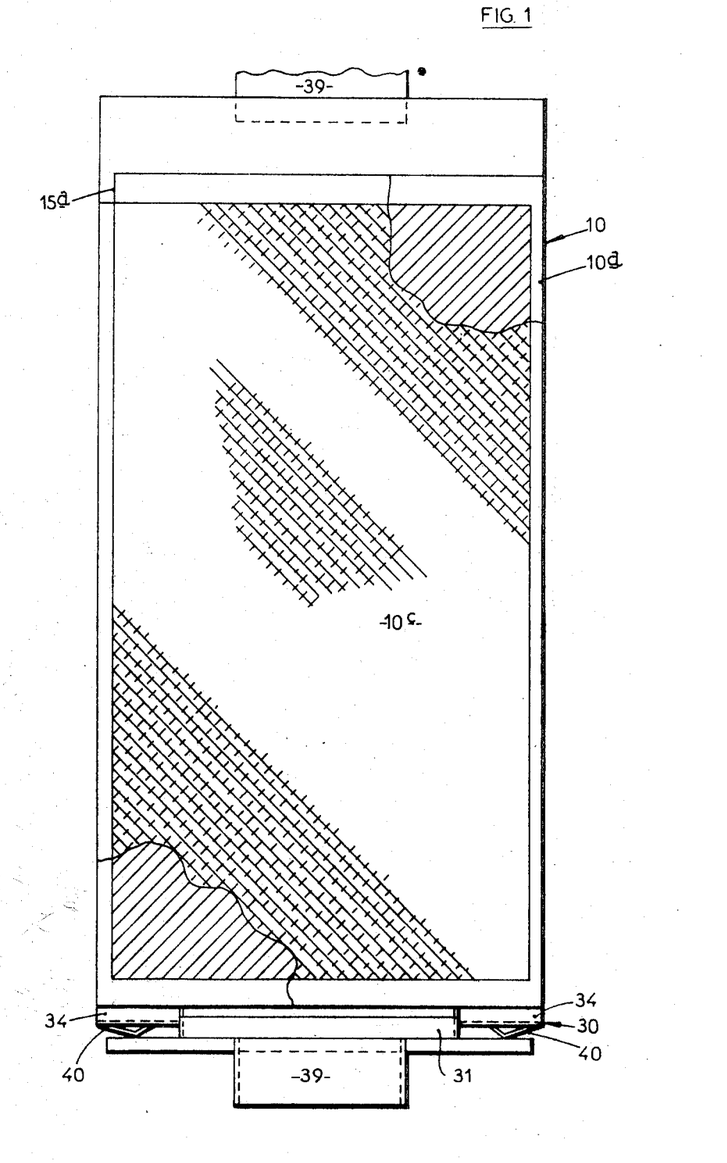
FIG. 1 shows a side view of a single evaporator stage and collector tray with the casing omitted to show the internal details thereof, FIGS. 2A, 2B and 2C in combination show a vertical section on the line 2—2 of FIG. 1, on a larger scale.

The main parts of the middle portions 10a of the plates 10 are of corrugated form as can be seen from FIGS. 1 and 2. The corrugations extend in a diagonal manner across the middle portions 10a, but do not extend completely to the edges, an uncorrugated margin extending completely around the corrugated area. It will thus be seen that when two identical plates 10 are placed in face-to-face relation with the middle portions 10a in contact to define a central evaporating passage 32, the corrugations of the respective plates extend transversely relative to one another so that the corrugated parts of the middle portions have substantially point contact with one another. Thus a substantially unrestricted flow of the liquid film is possible, but the rigidity of the plates is improved and a minimum spacing between adjacent plates is ensured. Additionally, due to the mutually inclined disposition of the corrugations of the two plates defining the central evaporating passage, the liqiud film tends to fall evenly over the entire width of the plate.

Between each pair of composite plates 10 a respective partition plate 18 is provided. Each partition plate 18 is of generally inverted U-shape in end elevation as can be seen from FIG. 2. The vertical plate-like side portions 19 of the partition plates 18 each carry a lining 19' of thermally insulating material as shown. The partition plates 18 may be made of the same material as the composite plates 10 and the lining 19' may comprise a phenolic laminate. Alternatively, the partition plates as a whole may be made of a thermally insulating material having the necessary mechanical strength.

As can be seen from FIG. 2, the side portions 19 of the partition plates 18 extend between the middle portions 10a and the bottom portions 10c of the adjacent composite plates 10. The bottom portions 10c are formed with cutaway portions 15a (FIG. 4) at their upper corners. The bottom portions 10c of the composite plates 10 are themselves corrugated in a similar manner to the middle portions 10a. The corrugations of the bottom portions may extend transversely relative to the corrugations of the adjacent middle portion as shown or they may be parallel thereto.

Thus, as can be seen, each adjacent pair of bottom portions 10c have only substantially point contact with each other and define a condensate outlet passageway 36.

Heating fluid at the appropriate temperature and pressure P1 is supplied to the spaces between the pairs of composite plates 10 and the middle portions 10a of these plates in combination with the side portions 19 of the partition plates 18 define respective heating fluid passages 33 in which heating fluid flows in heat exchange relationship with the liquid within the central evaporating passage 32. In the first stage of a multistage evaporator, the heating fluid may comprise steam or re-cycled (recompressed and reheated) excess vapor from the final stage. In the remaining stages, the heating fluid comprises excess vapor from the preceding stage.

The steam, or vapor, in the heating passages 33 is thus partially condensed as it gives up heat to the liquid in the adjacent central evaporating passageway 32 which is at a lower pressure P2 so that such liquid is at least partially evaporated. The condensate collects in the channels 15 defined between the middle portions 10a and bottom portions 10c of the plates 10. However, the side portions 19 of the partition plates 18 divide the channels 15 in a barometric leg arrangement of which one side is constituted by the respective heating passage 33 and the other by an outer passage 35 defined between the side portion 19 and the bottom portion 10c.

The pressure within the down-flowing condensate outlet passages 36 is the same as that within the central evaporating passages 32 since both said passages open at their lower ends into the same space, and so a rising column of condensate is maintained in the outer passages 35, the pressure P2 in the outlet passage 36 being less than the pressure P1 in the heating passage 33. The maximum pressure differential is determined by the height of the bottom portions 10c and the vapor in each stage is isolated by the column of condensate in passages 35. Such condensate overflows through the cut-out portions 15a and passes down the outlet passages 36 only at the vertical edges thereof where they meet the end diaphragms.

At the sides of the stage, a partition plate 18a is provided with only one side portion 19a which extends into the channel 25 defined between the middle portion 10a and bottom portion 10c of the outermost composite plate 10. In this case the outermost outlet passage 36 is defined between the side plate 22 and the bottom portion 10c.

At their lower ends, the composite plates 10 and partition plates 18 are supported by a collector tray 30. The tray 30 includes a central shallow portion 31 in which excess unevaporated liquid from the central evaporating passage 32 collects. The central portion 31 does not extend for the full width of the plates 10, but includes at opposite edges respective U-section channels 34. As can be seen from FIG. 2, the side wall of the central portion 31 from which the channels 34 extend is of generally castellated form. Thus, the side wall affords a row of spaced rectangular projections 37 which enter into the interior of the inverted channel section strips 14 by means of which the bottom portions 10c of the composite plates 10 are secured to the middle portions 10a thereof. The channels 34 are disposed in alignment with alternate gaps between the projections 37, the side wall having a semi-circular opening 38 in which the ends of the channels 34, are received. The channels 34 are in register with the lower ends of the central evaporating passages 32 defined between the middle portions 10a of each pair of composite plates 10. The channels 34 thus receive excess unevaporated liquid from the central evaporating passage 32. The ends of the channels remote from the central portion 31 of the tray 30 are closed by means of the diaphragm 44 which engages the vertical edges of the composite plates 10 and partition plates 18.

The excess unevaporated liquid from the stage above the tray 30 thus drains into the central portion 31 and the latter is provided with respectively downwardly extending slot-like spouts 39 which extend into the reservoirs 17 afforded by the top portions 10b of the composite plates 10 of the next lower stage of the evaporator. In this way, the liquid is passed from stage to stage through the evaporator.

The condensate overflowing over the recesses 15a at the upper edges of the bottom portions 10c of the composite plates 10 flows down the outlet passages 36 over the uncorrugated vertical margins of the bottom portions 10c adjacent the diaphragms 44. The lower ends of the outlet passages 36 are disposed between the channels 34 which collect the unevaporated liquid and thus the condensate falls between such channels. The condensate is collected in respective transversely extending troughs 40 which are arranged beneath the channels 34 adjacent to the outer ends thereof. The troughs 40 are open at their ends which are spaced slightly inwardly from the adjacent side plate 22 as can be seen from FIG. 3. Thus, the condensate tends to flow down the inner face of the side plate 22, past the ends of the diaphragms 22a (FIGS. 2 and 4) which do not extend fully across the width of the plate 22, and into the outermost heating passages 33 of the subsequent stage. In this way, the condensate is cascaded through successive stages of the evaporator and gives up some of its heat to assist further evaporation of the liquid flowing through the central evaporating passages 32.

Any condensate passing through the gaps 41 instead of into the troughs 40, will fall through the gaps 42 between the upper ends of each pair of composite plates 10 of the next stage, since as can be seen from FIG. 2 the gaps 42 are aligned with the outlet passages 36, and hence it will flow to the inner heating passages 33 and will thus ultimately be recovered.

Vapor from the central evaporating passages 32 (derived from the liquid to be evaporated) and vapor from the outlet passages 36 (derived from the heating fluid) have access to the succeeding stage through the gaps 41 and 42. Provision may be made for extracting a proportion of the vapor from each stage to heat the vapor-to-liquid heat exchange surfaces through which the incoming liquid is passed before it is fed into the first stage to which it is supplied through a tray similar to the collector tray 30. Excess unevaporated liquid and the total condensate may be separated at the bottom of the final stage by means of a similar tray, the former from spouts 39 and the latter from troughs 40, and appropriate pumps may be provided to extract the concentrated unevaporated liquid and the condensate. The cold low pressure vapor remaining at the outlet end of the last stage may be recirculated after recompression and reheating.

Figure 5:
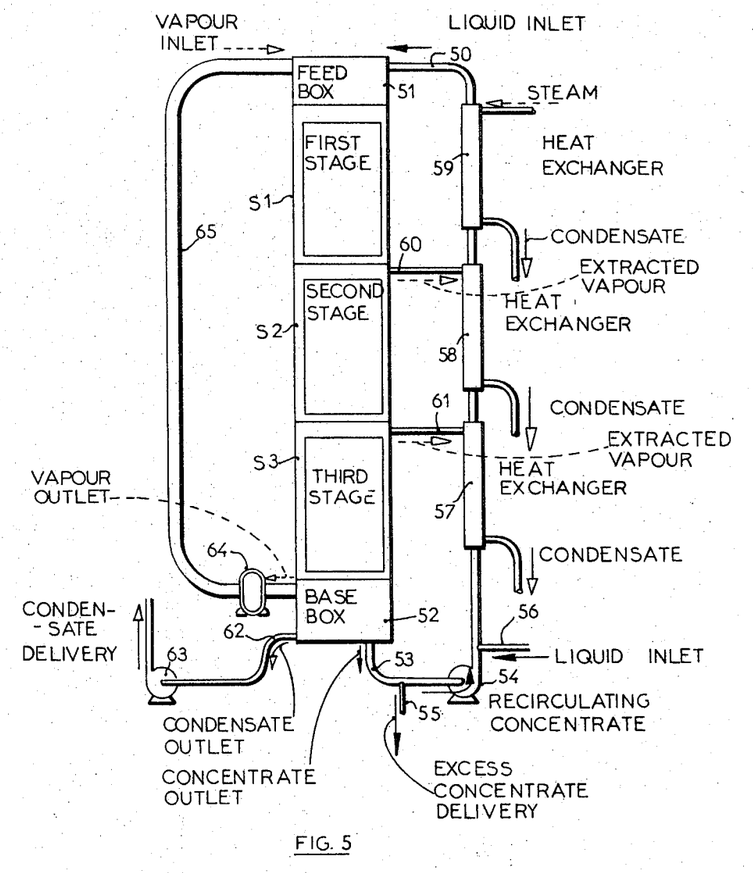
FIG. 5 is a diagram of a complete multi-stage evaporator plant.

An arrangement incorporating the features mentioned in the last preceding paragraph is illustrated diagrammatically in FIG. 5. This shows three stages S1, S2 and S3 arranged in a single column, and each stage incorporates the plates 10 and 18 together with a collector tray 30 as previously described. The liquid to be evaporated is fed in at the top of the column through inlet pipe 50 and into a distribution and feed box 51 which is substantially identical with the collector trays 30. The liquid to be evaporated is cascaded through the three stages and the excess concentrated liquid is extracted from a base box 52 through concentrate outlet pipe 53 by pump 54. The concentrated liquid is recirculated to the head of the column by the pump 54 after mixing with additional fresh liquid to be evaporated which is introduced through inlet pipe 56. A portion of the concentrated unevaporated liquid is continuously extracted from concentrate delivery pipe 55 in order to maintain the solute concentration of the liquid delivered to the inlet pipe 50 at a substantially constant value.

Between the pump 54 and the inlet pipe 50, the inlet liquid to be evaporated is passed through three heat exchangers 57, 58 and 59. The first two heat exchangers 58 and 57 are supplied with vapor extracted from the second and third stages S2 and S3 respectively through vapor extraction pipes 60 and 61. The extracted vapor thus gives up some of its heat to the incoming liquid and is thereby condensed and can be added to the condensate which is extracted from the base box 52 at the bottom of the column through condensate outlet pipe 62 by pump 63. The final heat exchanger 59 is fed with steam, or other appropriate vapor to raise the temperature of the incoming liquid to the vapor temperature existing in the distribution and feed box 51 at the top of the column.

The vapor pressure existing in the column falls between successive stages from a value P1 in the distribution and feed box 51 at the top of the column through values P2 and P3 in stages S2 and S3 to a final value P4 in the base box 52 at the bottom of the column, the pressure differential being maintained by the columns of condensate in the outer passages 35. The vapor at pressure P4 in the base box is extracted and passed through a vapor compressor 64 and returned to the distribution and feed box 51 at the head of the column through vapor recirculation pipe 65 to serve as heating fluid.

The plant shown in FIG. 5 requires only a small quantity of steam to feed the heat exchanger 59 and the recirculating recompressed vapor delivered by the compressor 64 is sufficient to maintain the evaporator in continuous operation.

However, it will be understood that where cooling water and sufficient live steam can be made available, the heating fluid fed to the first stage through the distribution and feed box could comprise steam instead of the recirculated and recompressed vapor extracted from the last stage as in FIG. 5. In this case, the vapor from the base box 52 would be condensed by passing it to any suitable vapor condensing apparatus.

It will thus be apparent that the evaporator in accordance with the invention is of a particularly simple design and requires only a comparatively small number of different parts which can readily be assembled in very large numbers. The various plates incorporated in the structure can be assembled together quite easily and do not require securing together in any way. Only the outermost partition plates 18a require to be secured to the side plates 22. The composite plates 10 are supported by the trays 30 and in turn support the partition plates 18. The side portions 19 of the partition plates 18 are gripped between the corrugations of the middle portions 10a and bottom portions 10c of the composite plates 10 and held in assembled relation therewith. Normally, the force exerted on the side-portions 19 of the partition plates 18 by the corrugations is sufficient to maintain the partition plates 18 in the initially assembled position with a small clearance between the lower ends of the partition plates and the strips 15.

What is claimed is:

1. A multi-stage evaporator for evaporating a liquid by means of a heating fluid comprising
   (a) a plurality of evaporator stages arranged in series communication with one beneath the other and each comprising
       (i) at least one pair of vertically arranged spaced parallel plates, each plate comprising top, middle and bottom portions, the middle portions of adjacent plates defining a central evaporating passage, the top portions of adjacent plates extending inwardly and downwardly relative to the middle portions and being formed to provide together a pressure-reducing orifice arranged to receive the liquid to be evaporated and deliver it to the central evaporating passage, and the bottom portions extending upwardly and outwardly relative to the middle portions to provide reservoirs for reception of condensed heating fluid, and
       (ii) respective partitions each extending into a respective one of said reservoirs and defining in combination with the middle portion of a respective plate a passage for said heating fluid, the partitions also defining in combination with the middle and bottom portions respective barometric leg arrangements whereby a quantity of said condensed heating fluid in said barometric leg establishes a pressure differential between a relatively higher pressure zone including said heating fluid passages and a relatively lower pressure zone to which said condensed heating fluid can overflow from said reservoirs,
   (b) a casing comprising
       (i) said plates parallel to said plates of the evaporator stages,
       (ii) resilient diaphragms sealingly engaging the edges of the plates and partitions of the evaporator stages,
       (iii) separate inlet means for said liquid to be evaporated and for said heating fluid, and
       (iv) separate outlet means for residual unevaporated liquid from said central evaporating passages and for said condensed heating fluid overflowing from said reservoirs, and
   (c) respective collector tray assemblies arranged within said casing between vertically adjacent pairs of said evaporator stages and each comprising (i) means for collecting said condensed heating fluid overflowing from said reservoirs of the upper of said pair of evaporator stages and delivering said condensed heating fluid into the heating fluid passages of the lower of said pair of evaporator stages, (ii) means for collecting said residual unevaporated liquid from each central evaporating passage of the upper of said pair of evaporator stages and delivering said residual unevaporated liquid to each pressure reducing orifice of the lower of said pair of evaporator stages, and (iii) means for allowing vapor from the upper of said pair of evaporator stages to pass to the heating fluid passages of the lower of said pair of evaporator stages.

2. A multi-stage evaporator according to claim 1 wherein the middle portions of said plates which define the central evaporating passages are formed with corrugations which extend downwardly at an oblique angle to the vertical edges of the plates, the corrugations of the middle portions of each pair of said plates extending transversely relative to one another so that the plates contact each other at a plurality of spaced points.

3. A multi-stage evaporator according to claim 1 wherein the bottom portions of said plates of the evaporator stages are formed with corrugations which extend downwardly at an oblique angle to the vertical edges of the plates, the corrugations of the bottom portions of the plates defining adjacent reservoirs extending transversely relative to one another so that said bottom portions contact each other at a plurality of spaced points and define therebetween an outlet passage for said condensed heating fluid overflowing from said reservoirs.

4. A multi-stage evaporator according to claim 1 wherein said partitions of the evaporator stages each include a sheet-like portion of thermally insulating material where they extend into said reservoirs.

5. A multi-stage evaporator according to claim 1 wherein said means for collecting said residual unevaporated liquid comprises channel means aligned with the lower end of each central evaporating passage of the upper of the pair of evaporator stages concerned, a shallow central portion of said collector tray assemblies which serves as a reservoir into which said residual unevaporated liquid drains from said channel means, and respective downwardly extending spout means to deliver said residual unevaporated liquid from said shallow central portion to each pressure-reducing orifice of the lower of said pair of evaporator stages.

6. A multi-stage evaporator according to claim 5 wherein said means for collecting said condensed heating fluid overflowing from said reservoirs comprise transversely extending trough means provided beneath said channel means at ends thereof remote from the central portion of said collector tray assemblies, said reservoirs of the evaporator stages having outlet means for delivering said condensed heating fluid overflowing from said reservoirs substantially wholly at the lateral margins of said plates, and said trough means being disposed beneath said lateral margins, so that said condensed heating fluid has access between said channel means to said trough means.

7. A multi-stage evaporator according to claim 6 wherein said trough means are open at their ends so that the condensed heating fluid collected therein is delivered from the ends of the trough means into the vicinity of said side plates of the casing to flow down said side plates into the outermost heating passages of the next stage.

8. A multi-stage evaporator according to claim 1 wherein distributor means is provided within the central evaporating passage positively to direct liquid to be evaporated from said pressure-reducing orifice onto the surface of the middle portions of the plates defining the central evaporating passage so as to ensure the formation thereon of a continuous thin falling film of said liquid to be evaporated.

9. A multi-stage evaporator according to claim 8 wherein said distributor means comprises a trough whereby said liquid to be evaporated, after flowing through said pressure-reducing orifice, is caused to flow upwardly on each side of the top portions of said plates which define said pressure-reducing orifice and then outwardly over upper edges of said trough onto the surfaces of the middle portions of said plates which define the central evaporating passage.

10. A multi-stage evaporator according to claim 9 wherein the middle portions of said plates which defines the central evaporating passage include outwardly cranked parts at a position above said pressure-reducing orifice and said trough includes correspondingly outwardly cranked sides whereby said liquid to be evaporated overflowing over the upper edges of the trough is positively constrained to flow inwardly over said outwardly cranked parts of said middle portions of the plates.

References Cited

UNITED STATES PATENTS

| | | | |
|---|---|---|---|
| 3,150,028 | 9/1964 | Wennerberg | 165—166 X |
| 3,195,625 | 7/1965 | Thomson | 165—166 |
| 3,371,709 | 3/1968 | Rosenblad | 159—28 P X |
| 3,493,040 | 2/1970 | Davidson | 165—115 |
| 3,616,835 | 11/1971 | Laurenty | 159—28 P X |

FOREIGN PATENTS

| | | | |
|---|---|---|---|
| 912,467 | 12/1962 | Great Britain | 159—28 P |

JACK SOFER, Primary Examiner

U.S. Cl. X.R.

159—18, 28 P; 165—166